Jan. 10, 1950 S. D. RUSSELL 2,494,360
BELT TIGHTENER

Filed Feb. 17, 1945 2 Sheets-Sheet 1

INVENTOR.
Stanley D Russell
BY
Emerson B Donnell
ATTORNEY

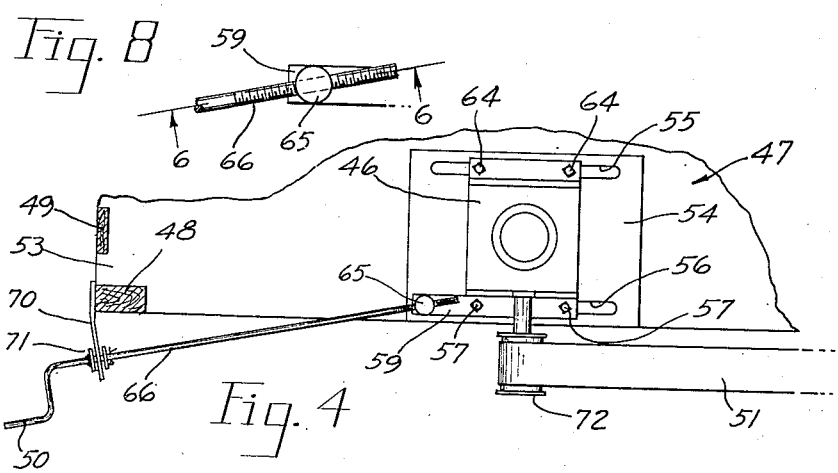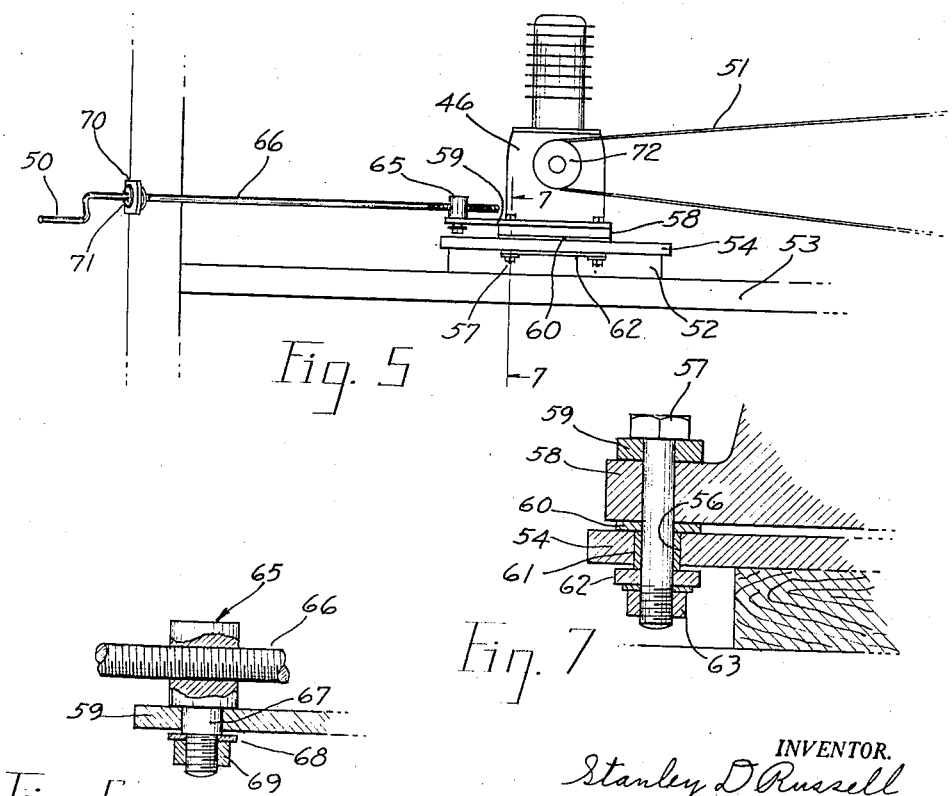

Patented Jan. 10, 1950

2,494,360

UNITED STATES PATENT OFFICE 2,494,360

BELT TIGHTENER

Stanley D. Russell, Racine, Wis., assignor to J. I. Case Company, Racine, Wis., a corporation of Wisconsin Application February 17, 1945, Serial No. 578,371

4 Claims. (Cl. 74—242.13)

The present invention relates to engine bases or bases for other prime movers, or mechanism, and particularly to that type which is movable for adjusting a belt leading from the engine or other mechanism. An object thereof is to generally improve the construction and operation of devices of this class.

A further object is to provide means for shifting an engine, or other device having a pulley, so that it can serve the purposes of a clutch and a belt tightening idler whereby it is possible to dispense with other expedients for these purposes.

A further object is to provide such a structure which will be convenient to install in a variety of situations because of a certain latitude permissible in the disposition of the parts.

Other objects are to provide expedients for the realization of the above objects.

Further objects and advantages will become apparent from the following specification and the accompanying drawings in which satisfactory embodiments of the invention are shown. However, it is to be understood that the invention is not limited to the details disclosed but includes all such variations and modifications as fall within the spirit of the invention as herein expressed.

Fig. 4 is a plan view of a modified installation.

Fig. 5 is a side elevation of the same.

Fig. 6 is a sectional view taken substantially on the line 6—6 of Fig. 8.

Fig. 7 is a sectional view taken on the line 7—7 of Fig. 5.

Fig. 8 is an enlarged detail of certain mechanism indicated in Fig. 4.

In the manufacture of farm machinery such for example as balers, loaders, and the like, it is essential that satisfactory mechanism be provided at the very least possible cost. These machines are commonly driven by internal combustion engines not adapted to starting readily under load. Furthermore, the simplest convenient drive from such an engine in an inexpensive machine is commonly a belt which, with the comparatively short centers commonly required, ordinarily must have some means for adjusting its tension. This has been accomplished in the past by the use of some sort of an idler pulley which has been a somewhat troublesome and needless complication. Also, in order to facilitate starting of the engine, it has often been provided with a clutch which adds appreciably to the cost and provides one more place which is difficult to repair in case of failure after long usage.

In the present instance, the purposes of both of these units are served by a single relatively simple expedient.

Figure 1:
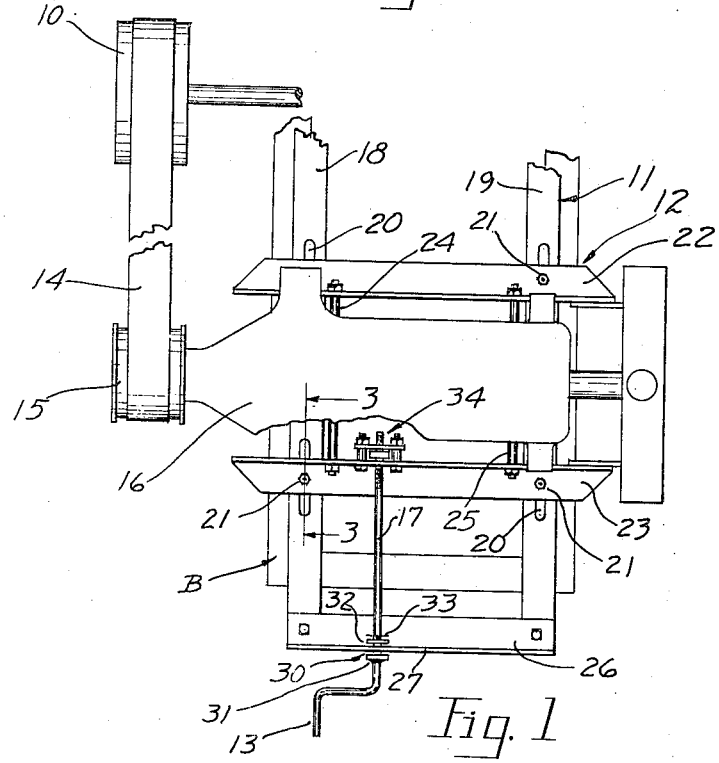
Figure 1 shows a plan view of the engine base applied to a machine such as a baler.

Turning to Figure 1, the device is shown as applied to a baler generally designated as B and having a driven wheel or pulley 10 which is connected to operate the baling and feeding mechanism not shown and forming no part of the present invention. The device comprises a stationary base generally designated as 11 and a movable portion or base 12, the movable base being shiftable by means of a crank 13 to tighten and loosen a belt 14 disposed about wheel 10 and a pulley 15 carried and operated by engine 16 fastened in any suitable manner to movable base 12.

It is to be noted that engine 16 is ordinarily of substantial weight and causes a considerable friction drag on base 11 when movable base 12 is shifted. Also belt 14 exerts a reaction against pulley 15 which is in the same direction as the reaction caused by said friction drag during tightening movement. Crank 13 terminates in a threaded shaft 17 which engages base 12, and it is to be noted that the pull of rod 17 is exerted on movable base 12 in the opposite direction to the above two forces and between them. Thus, the belt pull and the friction drag are approximately balanced against each other so that there is no substantial tendency to swing the engine and base away from a position wherein pulley 15 and belt 14 are in proper alignment.

Figure 3:
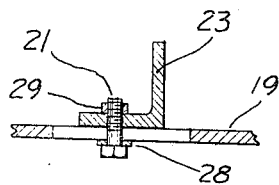
Fig. 3 is a similar view taken on the line 3—3 of Fig. 1.

Returning to a more complete description of this embodiment, base 11 comprises spaced bars or angle irons 18 and 19 provided with slots 20—20 for guiding movable base 12. Slots 20—20 are traversed by guiding bolts 21—21 as more particularly seen in Fig. 3. Base 12 comprises bars or angle irons 22 and 23 spaced apart by suitable braces 24 and 25 and further braced in the present instance by the base portion of engine 16 whereby a rigid rectangular frame is provided which may slide as a unit on base 11.

Bars 18 and 19 are united at one end by a cross member 26 provided in the present instance with an upstanding flange 27. Bolts 21—21 are preferably threaded into angle irons 22 and 23 from below, a washer 28 being arranged beneath bar 19 to provide a satisfactory sliding bearing on the underside of the latter. Bolts 21 are adjusted to eliminate any appreciable slack or upand-down play between base 12 and base 11, whereupon locknuts 29 are tightened on the upwardly projecting ends of the bolts to maintain adjustment. In this manner, base 12 is guided at four generally spaced points for free sliding movement in the direction of bars 18 and 19, or in other words, in the direction of belt 14.

As above indicated, threaded shaft 17 is engaged between base 11 and movable base 12, a thrust bearing generally designated as 30 engaging above mentioned flange 27 and preventing endwise movement of shaft 17. Bearing 30 comprises a washer 31 welded or otherwise fixed with shaft 17 and a washer 32 removably maintained on the shaft in the present instance by a cotter pin or the like 33.

In this class of machinery, tolerances are necessarily quite large and accordingly a very simple type of self-aligning connection, generally designated as 34 is provided between shaft 17 and bar 23 of movable frame 12.

Figure 2:
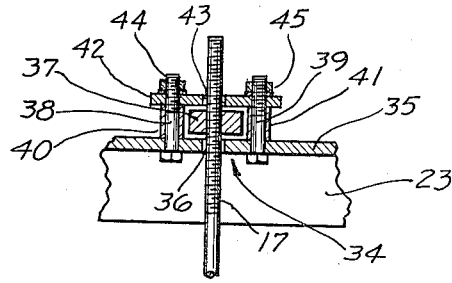
Fig. 2 is a sectional detail of certain mechanism indicated in Fig. 1.

As best seen in Fig. 2, bar 23 has an upstanding flange 35, shaft 17 passing freely through an opening 36 therein. A nut 37 is engaged with shaft 17 and maintained against turning by bolts 38 and 39 having sleeves 40 and 41 for spacing a plate or strap 42 a little beyond nut 37. Shaft 17 also passes freely through an opening 43 in strap 42, the latter being maintained against spacers 40 and 41 by nuts 44 and 45 threaded on bolts 38 and 39 respectively. Thus it will be apparent that nut 37 cannot escape from between flange 35 and strap 42 but that it is free to move slightly in response to any irregularity in the movement of base 12 or shaft 17. A suitable amount of freedom is also provided in thrust bearing 30.

As above stated, shaft 17 is offset and exerts its pull on base 12 at a point between the reaction of belt 14 and the point of application of the friction drag caused by the weight of engine 16. The exact point of application of the force of shaft 17 is best determined by experiment but in general it will be so located that the distance transverse to belt 14 from the belt to the shaft will be related to the distance from the shaft to the center of frictional resistance inversely as the value of the belt pull is related to the value of the frictional resistance. The result is a surprisingly easy shifting of the engine and sensitive and easily controlled tightening of the belt.

When the belt is to be loosened, the belt of course operates to assist the thrust set up in shaft 17 so that no appreciable excessive resistance is encountered. In fact the action of shaft 17 is so effective that the engine is readily shifted for starting and stopping the wheel or pulley 10 in the manner of a friction clutch thus dispensing with the necessity for this element.

Turning to Figs. 4 and 5, a modification is shown illustrative of the adaptability of the principles involved. In this instance, an engine 46 is installed on a loader generally designated as 47 and which has an upright 48 and a brace 49 which would interfere with the location of a crank 50 in line with a belt 51, driving parts of the loader not shown.

In this embodiment, a block 52 is fastened on the deck 53 of loader 47 and carries a plate 54 having slots 55 and 56.

Bolts 57—57 traverse a flange 58, Fig. 7, constituting part of the base of engine 46 and pass through slot 56 to form guides for sliding of the engine on plate 54. A strap 59 is engaged under the heads of bolts 57 and a bearing strip 60 is interposed between flange 58 and plate 54. A spacer 61 surrounds bolt 57 within slot 56 and serves to space a strap 62 a slight distance beneath plate 54. Nut 63 clamps the several parts together in rigid relation so that a freely slidable bearing is provided for engine 46 without appreciable up-and-down play.

Bolts 64—64 are provided on the other side of engine 46, the arrangement being substantially identical, although strap 59 may be omitted if desired.

Strap 59, in the present instance, extends to the left of engine 46, as seen in Fig. 5, and is engaged by a fitting generally designated as 65, having a threaded bore engaging a threaded shaft 66 connected with crank 50.

Fitting 65 has a neck 67 journaled in a suitable bore in strap 59 and a washer 68 is shouldered on neck 67 and clamped by a nut 69. Thus fitting 65 may turn freely in strap 59 and sufficient freedom is provided to avoid binding.

Shaft 66, as in case of the Fig. 1 embodiment, engages the unit comprised by engine 46 and straps 59, 60, etc., at a point between the point or center of frictional resistance and the center of pull of the belt. In this manner, there is no objectionable tendency toward swinging of the engine and binding of the bolts 57 and 64 in slots 56 and 55. While the principle of this arrangement is as above described in the previous embodiment, considerable latitude has been found permissible in the location of the parts. In the present instance, because of the encroachment of brace 49, on the space which might be desirable for shaft 66, the latter has been inclined somewhat from a direction parallel to belt 51 and is supported in a bracket 70 fixed on upright 48, a thrust bearing 71 being provided of a character similar or identical with above mentioned bearing 30. Sufficient freedom is allowed in bearing 71 to provide for the slight swinging of shaft 66 due to the movement of engine 46 in a direction which is non-parallel with shaft 66.

By manipulating crank 50, engine 46 may be readily moved back and forth to tighten or loosen belt 51 about pulley 72.

The above being a complete description of illustrative embodiments of the invention, what is claimed as new and desired to be secured by Letters Patent of the United States is:

1. In a belt tightener, a stationary frame, a movable frame supported on the stationary frame, and means for shifting the movable frame including a threaded shaft engaged between the stationary frame and the movable frame, said shaft having a thrust bearing on one of said frames, the other frame having an upstanding flange and a nut engaged with the flange and threaded on the shaft, spaced studs loosely engaging the nut to prevent turning thereof, and a strap carried by said studs and maintaining said nut floatingly in place against said flange for moving said movable frame in response to turning of said threaded shaft.

2. In a belt tightener and engine base, a pair of spaced slotted longitudinally extending members, a base frame slidable relatively to said longitudinal members, and a plurality of bolts rigidly clamped on said base frame and extending through the slots of said members and freely slidable therein while so clamped in said base frame for relatively free guided movement of said base relatively to said longitudinal members.

3. In a belt tightener and engine base, a slotted support member, a base slidable relatively to said slotted member, and a plurality of bolts rigidly clamped on said base and extending through the slots of said member and freely slidable therein while so clamped in said base for relatively free guided movement of said base relatively to said longitudinal member.

4. In a belt tightener, a prime mover base member, a support member for said base member, said base member being slidable on said support member, one of said members being slotted, and a plurality of bolts rigidly clamped on the other member and extending through the slotted portion of the first member and freely slidable therein while so clamped in the other member, for relatively free guided movement of said base member relatively to said support member.

STANLEY D. RUSSELL.

REFERENCES CITED

The following references are of record in the file of this patent:

UNITED STATES PATENTS

| Number | Name | Date |
| --- | --- | --- |
| 1,353,986 | Bergendorf | Sept. 28, 1920 |
| 1,511,336 | Hoey | Oct. 14, 1924 |
| 1,822,935 | Reeves | Sept. 15, 1931 |
| 1,878,983 | Harris | Sept. 20, 1932 |